United States Patent
Heath et al.

(10) Patent No.: US 10,306,463 B2
(45) Date of Patent: May 28, 2019

(54) SECURE DATA LINK FOR SUBSCRIBER IDENTIFICATION MODULE (SIM)-BASED PROCESSOR

(71) Applicant: Able Device, Inc., Raleigh, NC (US)

(72) Inventors: Michael C. Heath, Cary, NC (US); Roger D. Dewey, Raleigh, NC (US)

(73) Assignee: Able Device, Inc., Raleigh, NC (US)

( * ) Notice: Subject to any disclaimer, the term of this patent is extended or adjusted under 35 U.S.C. 154(b) by 0 days.

(21) Appl. No.: 15/921,175

(22) Filed: Mar. 14, 2018

(65) Prior Publication Data

US 2018/0206111 A1  Jul. 19, 2018

Related U.S. Application Data (63) Continuation of application No. PCT/US2016/052552, filed on Sep. 19, 2016.

(60) Provisional application No. 62/220,955, filed on Sep. 18, 2015.

(51) Int. Cl.
| | |
|---|---|
| H04W 8/20 | (2009.01) |
| H04W 4/60 | (2018.01) |
| H04W 12/02 | (2009.01) |
| H04W 4/70 | (2018.01) |

(52) U.S. Cl.
CPC .............. *H04W 8/205* (2013.01); *H04W 4/60* (2018.02); *H04W 12/02* (2013.01); *H04W 4/70* (2018.02)

(58) Field of Classification Search
CPC .......... H04W 8/205; H04W 4/60; H04W 4/70
See application file for complete search history.

(56) References Cited

U.S. PATENT DOCUMENTS

| | | | |
|---|---|---|---|
| 6,978,157 B1 * | 12/2005 | Amiens ................... | H04L 63/10 455/420 |
| 2001/0034246 A1 * | 10/2001 | Hutchison, IV ...... | H04M 1/725 455/557 |
| 2007/0042755 A1 | 2/2007 | Singhal | |

(Continued)

FOREIGN PATENT DOCUMENTS

| | | |
|---|---|---|
| WO | 2010088095 A1 | 8/2010 |
| WO | 2011116324 A3 | 9/2011 |
| WO | 2014023247 A1 | 2/2014 |

OTHER PUBLICATIONS

PCT, International Search Report and Written Opinion in International Application No. PCT/US2016/052552 dated Dec. 1, 2016.

*Primary Examiner* — Said M Elnoubi
(74) *Attorney, Agent, or Firm* — NK Patent Law (57) ABSTRACT

The subject matter described herein includes methods, systems, and computer program products for providing a bi-directional data path to a SIM containing an executable program. According to one system, a subscriber identification module (SIM) is provided that includes a memory configured to store one or more executable instructions and a processor configured to execute the one or more executable instructions to generate one or more commands for controlling a device. At the SIM, a bi-directional data communications link, such as a serial communications link to the SIM processor, is simulated in software. The simulated communications link provides for bi-directional data communications between a customer application which is executed on the SIM and an external device which is not executed on the SIM, such as a microprocessor or cell module.

17 Claims, 4 Drawing Sheets

(56) References Cited

U.S. PATENT DOCUMENTS

| | | | |
|---|---|---|---|
| 2008/0208955 A1* | 8/2008 | Cao | H04M 3/436 709/202 |
| 2012/0108294 A1* | 5/2012 | Kaul | G06K 7/0013 455/558 |
| 2012/0196656 A1 | 8/2012 | Dewey et al. | |
| 2015/0011202 A1* | 1/2015 | Guo | H04M 1/72563 455/418 |

* cited by examiner

SECURE DATA LINK FOR SUBSCRIBER IDENTIFICATION MODULE (SIM)-BASED PROCESSOR

CROSS-REFERENCE TO RELATED APPLICATION

This application is a continuation of PCT Patent Application No. PCT/US2016/052552 filed on Sep. 19, 2016, which claims priority to U.S. Provisional Patent Application No. 62/220,955 filed on Sep. 18, 2015, the entire contents of all of which are incorporated by reference herein.

BACKGROUND

Field of the Invention

The present invention relates to a communications link, and more specifically, to providing a bi-directional data path to a SIM containing an executable program.

Description of Related Art

A subscriber identity module or subscriber identification module (SIM) is an integrated circuit chip that is intended to securely store information, typically an international mobile subscriber identity (IMSI) number and a key, which are used to identify and authenticate subscribers on mobile telephony devices. More recently, the functionality of SIM cards has been extended to allow a logic program to reside on the SIM card. The logic program may contain a function to control the operation of the input and output control lines of a wireless modem, as well as logic for controlling the wireless function of the modem. This eliminates the need for a processor between the modem and machine by having the logic reside in the modem to receive the SIM commands, therefore providing direct access to the control lines, and ultimately, any subsequently-linked device. Such SIMs may be referred to as "SIM processors."

One application of a SIM processor includes M2M (machine-to-machine). In an M2M application, a common set of control functions may be provided which can be selected to accomplish machine control and command functions for common machine control and status reporting without the need for custom logic design.

One limitation, however, of current SIM processors in that traditional data links do not provide a direct connection to the SIM due to the SIM's restrictive bus structure. For example, an asynchronous receiver/transmitter (UART) connection is customarily provided by external devices, such as microprocessors and cell modules, in order to provide a data path to communicate serial data into and out of the processors and cell modules. Currently, however, this connection does not provide a data path to the SIM and no UART is implemented on the SIM.

Accordingly, a need exists for systems and methods that provide a UART, data link, or data path to the SIM processor. This lack of serial communications and the need to provide a UART (or data link) to the SIM.

BRIEF SUMMARY

The subject matter described herein includes methods, systems, and computer program products for providing a bi-directional data path to a SIM containing an executable program. According to one system, a subscriber identification module (SIM) is provided that includes a memory configured to store one or more executable instructions and a processor configured to execute the one or more executable instructions to generate one or more commands for controlling a device. At the SIM, a bi-directional data communications link, such as a serial communications link to the SIM processor, is simulated in software. The simulated communications link provides for bi-directional data communications between a customer application which is executed on the SIM and an external device which is not executed on the SIM, such as a microprocessor or cell module.

According to one or more embodiments, a method includes, at a first device that is a subscriber identification module (SIM) having a memory configured to store one or more executable instructions for a customer application and a processor configured to execute the one or more executable instructions to generate one or more commands for controlling a device, providing a bi-directional data communications link for providing a bi-directional data communications link between the customer application executing on the SIM and a second device external to the SIM. The customer application does not reside on the second device. The second device includes an input/output (I/O) hardware component that transmits instructions received from the SIM to control a third device.

According to one or more embodiments, the I/O hardware is one of a serial connection of an externally connected UART, USB, or GPIO used for the transmission of instructions.

According to one or more embodiments, providing a bi-directional data communications link includes communicating with the second device over a network.

According to one or more embodiments, providing a bi-directional data communications link includes providing multiple data communications links with the second device.

According to one or more embodiments, providing a bi-directional data communications link includes processing the received data communicated over the data communications links, and processing the received data includes at least one of: decoding, encrypting, or ordering the received data in order to make compatible or to secure different formats of connected data communications links or servers.

According to one or more embodiments, a system includes a first device that is a subscriber identification module (SIM). The first device includes a memory, and a processor. The first device is operable to execute one or more executable instructions of a customer application, and provide a bi-directional data communications link between the customer application executing on the SIM and a second device external to the SIM, wherein the customer application does not reside on the second device. The second device includes a communications interface for receiving the bi-directional communications link, an input/output (I/O) hardware component that transmits instructions received from the SIM to control a third device, and a processor. The second device is operable to receive instructions from the customer application through the bi-directional communications link, and transmit the received instructions from the customer application through the I/O hardware component for transmission to a third device. The third device is at least partially controlled by the instructions received from the customer application.

According to one or more embodiments, the data communications link includes multiple data communications links.

According to one or more embodiments, the SIM includes an encryption key or token.

According to one or more embodiments, the SIM is configured to process the received data communicated over the data communications links.

According to one or more embodiments, processing of the received data includes at least one of: decoding, encrypting, or ordering the received data in order to make compatible or to secure different formats of connected data communications links or servers.

According to one or more embodiments, a computer program product for carrying out the one or more methods disclosed herein is provided.

DETAILED DESCRIPTION

The subject matter described herein includes systems and methods for providing a bi-directional data path to a SIM containing an executable program. In contrast to conventional configurations, the present disclosure provides a data communications link providing a bidirectional data path to a proactive SIM containing an executable program. The present invention uses a software solution to simulate the serial port or UART on a SIM processor. A UART connection is customarily provided by external devices, such as microprocessors and cell modules, in order to provide a method to get serial data into and out of the processors and cell modules. However, an external device UART connection does not provide any data path to the SIM. The subject matter described herein resolves this problem and provides a data path to the SIM.

Thus, according to one aspect, the data communications link is a serial connection of an externally connected UART, USB, or GPIO used for the flow of information. The data flow to and from the data communications link can be passed to and received from another device wired or wirelessly and, in some embodiments, multiple data communications links may be used. According to another aspect, the proactive SIM may perform processing on the received data communicated over the data communications links, including use for encryption. Processing of the received data may also include decoding, encrypting, or ordering data in order to make it compatible or secure to different formats of connected data communications links or servers. Details of the methods and systems for providing this functionality are described below.

The subject matter described herein extends the functionality of related U.S. patent application Ser. No. 13/047,612, entitled "Control Systems Having a SIM for Controlling a Computing Device" filed on Mar. 14, 2011, which is incorporated by reference in its entirety by reference herein by, for example, adding a data link capability. The data link described herein is a data communications link, such as a serial data port link, to the SIM-based processor. Methods and systems are described herein that simulate a serial communications link to the SIM processor.

As used herein, SIMbae is a communications handler providing periodic access to and from the Customer Application and maintains communications between the module and the Customer Application. The Customer Application provides the customer specific logic for the customer application.

This disclosure includes a logic and interface description of both the SIMbae and the Customer Application (Customer Application) programs. The description is intended to provide the information needed by Java programmers to produce Java Card Run Environment (JCRE) programs. According to one aspect described herein, two programs will reside on the SIM card in the Java Card Program Space and will be accessible from the cellular module by standard 3GPP release 4 SIM/USIM Application Tool Kit Interface messages. The Customer Application and the SIMbae programs are independent and separate since SIMbae will not be customer alterable, the Customer Application will be alterable by the customer.

The purpose of this document is therefore to list the logic functions of the two programs and describe the interface between the Cellular module, SIMbae, and Customer Application so that the resultant JCRE program can be used for the first targeted customer as well as later expanded by re-using the program for the base code for future expansion. Thus, the SIMbae logic may be the same for all applications and distributed to developers to provide a communications link between the Customer Application and the module. The Customer Application can be the developed by the customer while the interface to the module can be handled by the SIMbae program. Additional functionality can be easily provided by additional Customer Applications which can be used with SIMbae.

Figure 1:
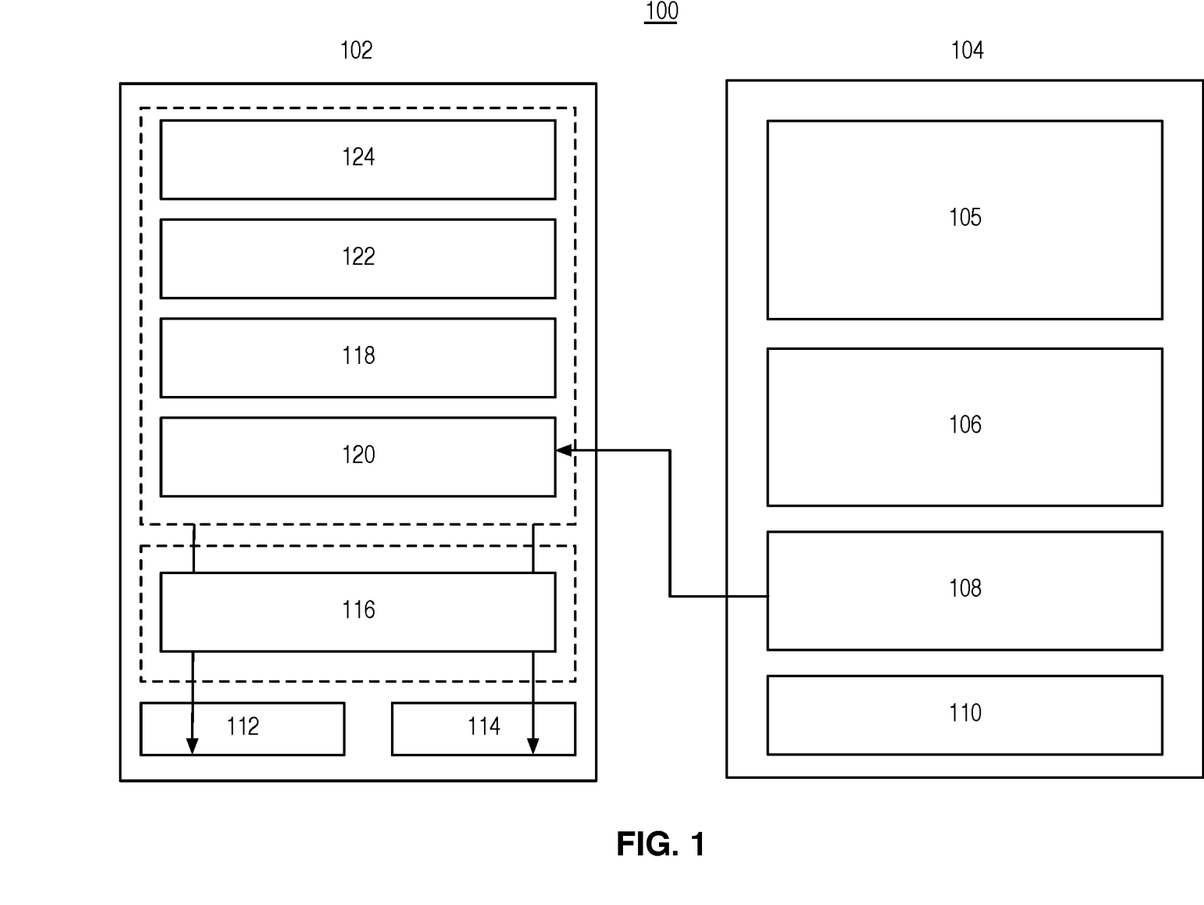
FIG. 1 is a system diagram showing functional components for providing a bi-directional data path to a SIM containing an executable program according to an embodiment of the subject matter described herein.

FIG. 1 is a system diagram showing functional components for providing a bi-directional data path to a SIM containing an executable program according to an embodiment of the subject matter described herein. SIMbae handles the communications between the SIM and the cell module. The SIM's Customer Application communicates through SIMbae to reach the module's peripheral functions. According to one aspect, SIMbae provides the interface and the Customer Application program provides the main functional logic.

FIG. 1 illustrates a system 100 that includes a SIM 104. The SIM 104 includes a customer application 106, a control application, sometimes referred to herein as SIMbase 108, and an encryption key 110. The control application 106 allows for the SIM 104 to be converted into a control device that uses the processor 105 to execute instructions stored in the memory of the SIM 104 for controlling a second entity, which is a remote entity.

The second entity is illustrated as 102 and in some embodiments may be a cell module or mobile control unit (MCU). The second entity 102 may include a processor and memory. Additionally, the second entity 102 may include any type of input/output (I/O) component such as a Universal Asynchronous Receiver/Transmitter (UART) 112, or Universal Serial Bus (USB) 114.

The second entity 102 may include cellular firmware 116. The second entity 102 may also include a general purpose input/output (GPIO) function for controlling the I/O hardware components. A SIMbae module application 120 for receiving encrypted data communications is provided and communicated over the bi-directional communication line.

A I2C communication function and UART_1 communication function 124 are also provided.

Additional function(s) can also be defined for providing encryption/decoding functionality. It may be appreciated that traditional computing devices often perform encryption and de-encryption and these traditional computing devices are therefore subject to 'hacking' since the executable program is not well protected. For example, traditional systems may be vulnerable to unwanted modification of the program as well as theft or modification of encryption keys. In contrast, the SIM processing techniques described herein allows for the program to be resident on the SIM, as well as any encryption codes and passwords, such that 'hacking' is not possible. Adding a serial data link feature to the SIM system has the benefit of allowing for data to be communicated to the SIM while allowing for the secure data processing to be handled within the SIM. The serial data link functionality on the SIM is thus able to process received data for encryption, decoding, or password key usage to be all internal to the SIM. This allows for the data to be acted on using coding/decoding methods while always remaining well protected in the secure SIM program.

Figure 2:
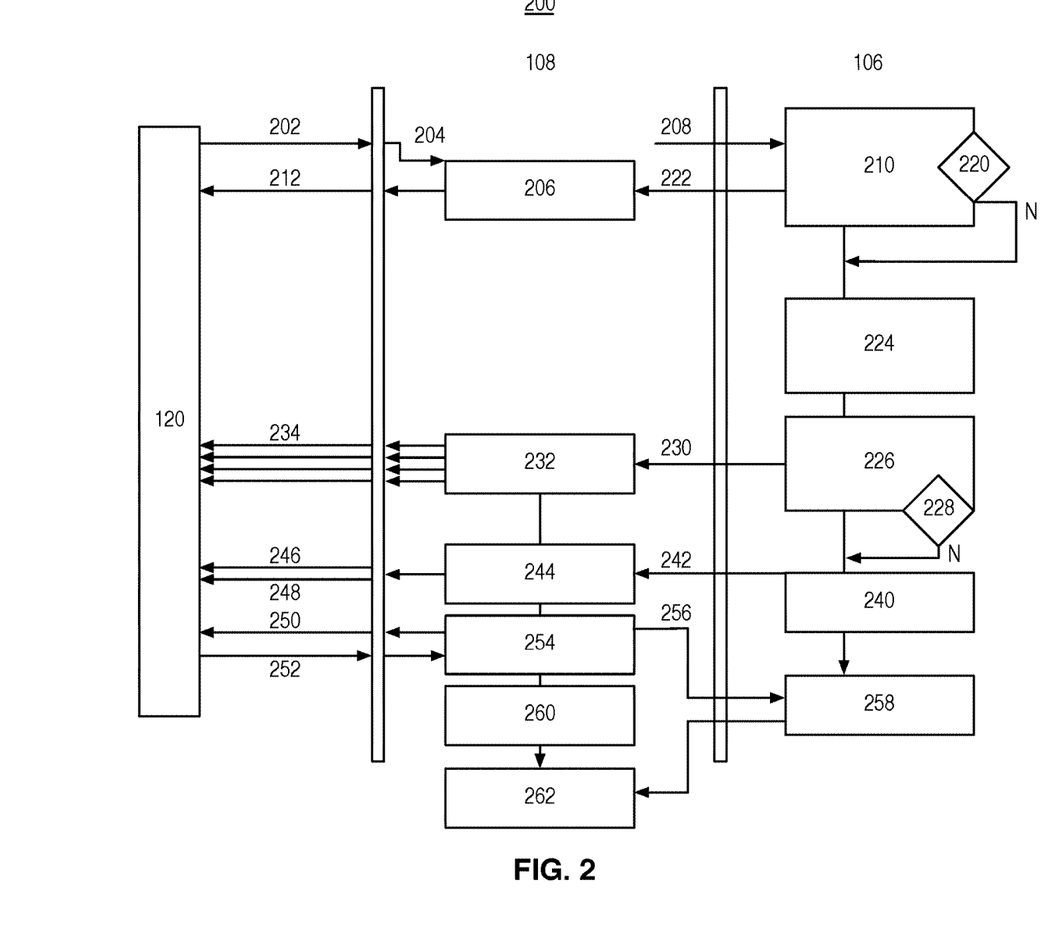
FIG. 2 is an overview diagram of the logic and interface for providing a bi-directional data path to a SIM containing an executable program according to one aspect of the subject matter described herein.

FIG. 2 is an overview diagram of the logic and interface for providing a bi-directional data path to a SIM containing an executable program according to one aspect of the subject matter described herein. In the embodiment shown, access to the passive SIM resident programs is controlled by periodic polling of the active module. In such an embodiment, the SIM may maintain a table of last status in order to maintain program state and pending tasks. Thus, the program shown in FIG. 1 may provide state, I/O, and command messaging by using both a "table format" messaging method specific to SIMbae as well as a general AT command encapsulated messaging technique. A "table format" may provide the majority of the expected operation of the system (I/O control, Serial Port, Control, Status, etc.) since it can be used by both the module and Customer Application to monitor state and status of pending tasks. The AT command encapsulated messaging may be used for accessing the module's specific function calls which may be outside the general operation of SIMbae.

For example, the SIMbae 108 may be located between the customer application 106 and the modem program 120. The module command interpreter may send a SIMpoll to the SIMbae via the SIM bus for SIMbae initialization. The SIMbae may initiate a service poll to the customer application. Also at SIMbae initialization, a clock is set and sent to the modem program. The customer application sends a request for poll limiting interval to the SIMbae and determines whether a change is required for the customer application. If no change is required, then the application logic of the customer application acts on input states received from the previous poll and determines if I/O change or read is required. The customer application then sets inputs for sensors and sets outputs for control. This includes sending a request for program of I/O lines to the I/O control of the SIMbae. The SIMbae I/O control sends program I/O lines to the module command interpreter. If I/O change is not required by the customer application, then the customer application may set outputs such as SMS, data call, etc. This may include sending request(s) for I/O set, SMS, or data call to the I/O line set call control of the SIMbae. The SIMbae then sends I/O line write instructions, SMS data message requests, and/or I/O line read requests to the modem program. The modem program returns received I/O line state, SMS, or data to the I/O input receive module of the SIMbae, which then sets I/O status register to the customer application. The customer application determines an I/O status change indication and ends program execution.

Additionally, in FIG. 2, the error control function block can detect whether the execution is still in process prior to the arrival of the next poll. If execution time is exceeded, the poll is incremented to allow for the next poll to occur at a slower rate. This error control function may also provide error correction of logic faults as needed to improve the robustness of the system.

The following additional elements or tasks are present in FIG. 2:

202: Sim Polling. This may be done on a predetermined interval or dynamic interval, depending on preferences;

204: Communication from SIM Bus to SIMbae Initialization;

206: SIMbae Initialization;

208: Continuation of SIM Poll;

210: State Control for Customer Application 106;

220: Change required, yes or no?;

222: Request for Poll timing interval;

224: Application logic. Act on input states received from previous poll and determine if I/O change or read is required;

226: Set inputs for sensors. Set output for control.

228: Change required, yes or no?;

230: Request for Program of I/O lines;

232: I/O control, Input/Output Set;

234: Program I/O Lines;

240: Set Outputs. SMS. Data Call;

242: Request for I/O set. Request SMS. Request Data Call;

244: I/O Line set. Call Control;

246: I/O line write;

248: SMS, data message request;

250: I/O Line read request;

252: Received I/O line state, SMS, data;

254: I/O input received;

256: Set I/O status. Register;

258: I/O status change indication;

260: Error Control; and

262: End execution.

Figure 3:
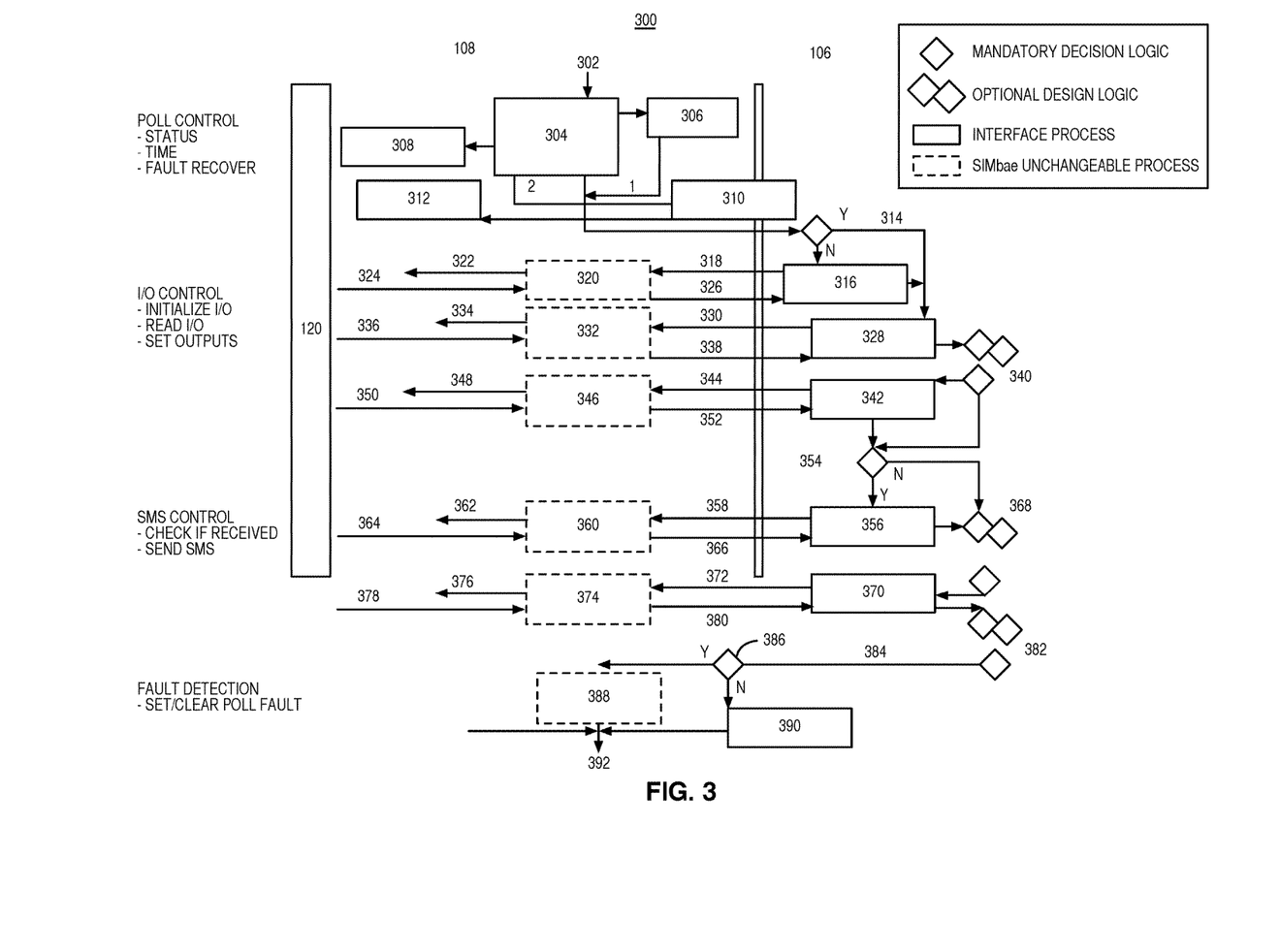
FIG. 3 is an expanded view of the logic shown in FIG. 2.

FIG. 3 is an expanded view of the logic shown in FIG. 2. Referring to FIG. 3, the operational state is shown to use a table format for polling control, I/O, and serial communications. Messaging between the Customer Application and SIMbae is accomplished by "table formatting", where messaging to the module consist of notification of the Polling Table, I/O Table, and UART message table. Polling control may be used to adjust the service events of the SIMbae program. According to one embodiment, a default configuration may be suggested which can be modified by the Customer Application for customization. Polling may be controlled by several factors including, but not limited to, module periodic timing control (detailed on module design doc), module RTC (real-time clock) settings, DTR input to module, Serial communications, Cellular network responses (call, SMS, etc.), pending processes tracked by the module as a result of commands from the customer app, and (unsolicited messages, module library calls).

The interface between the program entities may be controlled by the table entries shown in the Table I. below, which is an example of a "table format" for communicating command and status to other program modules.

TABLE I

| I/O Table GPIO # | Enabled | Enable Req | Input-1 Output = 0 | I/O State | ACK (0 = pending) |
|---|---|---|---|---|---|
| 1 | 1 | 0 | 0 | 0 | 0 |
| 2 | 1 | 0 | 1 | 0 | 1 |
| 3 | 1 | 0 | 1 | 1 | 0 |
| 4 | 1 | 0 | 0 | 0 | 1 |
| 5 | 1 | 0 | 0 | 0 | 1 |
| 6 | 1 | 0 | 0 | 1 | 1 |
| 7 | 0 | 1 | 1 | x | 0 |
| 8 | 0 | x | x | x | x |
| 9 | 0 | x | x | x | x |
| 10 | 0 | x | x | x | x |

TABLE II

| UART Table | Sequence # | LEN | Msg payload |
|---|---|---|---|
| In | 122 | 13 | +CREG: 0.1<CR><LF>OK |
| | 001 | 49 | SGPGLL,3723.2475,N,12158.3416, W,161229.487,A,A*41 |
| | 123 | 15 | +CSQ: 15.99<CR><LF>OK |
| Out | 122 | 5 | CREG? |
| | 123 | 4 | CSQ? |
| | 201 | 25 | Call: FTPSOC, open, 1234567890+++ |

Note:
LEN = Character length of message

1xx messages are AT commands generated by the Customer Application shown in UART "in" tables.

1xx message received are entered in the "out" table and tracked by the sequence number that generated the response.

0xx are unsolicited messages since not a response to a generated command.

2xx messages are library calls which require access library routines in the module.

According to one aspect, the module uses SIM/USIM toolkit messages to obtain table entries. The action for the module is determined by the contents of each table message. The SIM can command and track the status of the module's actions from the status messages received from the module using the "Display Text" message type. Alternately, for non-I/O commands, a text message can be used to communicate to the module using AT commands. This allows for library calls contained in the module as well as use non-I/O control type commands.

The communications path provided herein can support various types of messages such as I/O commands, non-I/O commands, and general purpose I/O (GPIO). For example, I/O status and setup may use status tables. Message tables may be access by the Customer Application to determine a module's action, such as enable, read, or write. An "ack" message may be used to determine which actions are current.

Control of GPIOs may be implemented using an I/O and UART table where the Customer Application uses the table(s) to track GPIO status and to enable ports. The module at poll event integrates the I/O tables to determine if updates are needed. One possible implementation is shown below (see the Table above for example contents):

In the possible implementation shown, the module activates the SIM from poll by activation of the SIM->at #STIA=2,1

Module sends->AT#STIA? To check for activation
SIM responds with <-#STIA=1, 2, 1, fffff . . . indicating SIM is active
Module sends "get info"->AT#STGI?
SIM responds <-#STI: 1,37
Modules sends <-AT#STGI=37 to see menu
SIM responds with <-#STGI 37,00,1, "SIMbae"
STGI 37,1, "GPIO1"
STGI 37,2, "GPIO2"
STGI 37,3, "GPIO3"
STGI 37,4, "GPIO4"
STGI 37,5, "GPIO5"
STGI 37,6, "GPIO6"
STGI 37,7, "GPIO7"
STGI 37,8, "GPIO8
STGI 37,9, "GPIO9
STGI 37,10, "GPIO10
STGI 37,11, "UARTin 1"
STGI 37,12, "UARTin 2"
STGI 37,13, "UARTin 3"
STGI 37,14, "UARTout 1"
STGI 37,15, "UARTout 2"
STGI 37,16, "UARTout 3"
STGI 37,17, "UART_library_call_1"
STGI 37,18, "UART_library_call_2"
Module sends: ->AT#STGI=37,0,1 to read contents of GPIO table for GPIO1
SIM responds <-#STN: 36
Module sends: ->AT#STGI=36, "1,0,0,0,0"
Module acts on contents of status contents.
Bit 0: =1 if GPIO is enabled, otherwise not enabled when =0,
Bit 1: =0 if I/O pin has already been enabled and is not a new request, otherwise if =1 this is a new request since last pole and the module should enable the I/O pin,
Bit 2: =0 if the I/O pin is an output, otherwise if =1 then pin is input,
Bit 3: =0 if the desired I/O state is output then output is shown by Bit 3 as requested but Customer Application; otherwise 0 or 1 depending on input state and set by module write to table,
Bit 4: =0 indicates state of the "Ack", 1 indicates process is complete, 0 indicates the process is pending execution.
If "Ack"=0 and port is output (Bit 2=0), then the module must update GPIO_1 of the module to the new desired output state indicated in Bit 3 then write the "Ack to 1 back to the Table showing that the Table has been updated with the new information so the Customer Application can check table to determine if last I/O state is valid.
Otherwise, if the "Ack"=1 then the GPIO has already been updated and Bit 3 reflects the current state of the output (set by previous polls).
If "Ack=0" and input (bit 2=1) indicating the Customer Application wants to read the state of the input pin, then the module reads GPIO_1 and sets Bit 3 to the new input state of the I/O pin, then sets "Ack" to 1 to notify the Customer Application the state of the I/O is current.
Customer Application reads the table to determine the GPIO state and resets the "Ack"=0 only if another read is required.
Otherwise, if the "Ack"=1 then the GPIO state is not current and bit 3 reflects a previous read. The customer must set the "Ack" to 0 to receive the current input state for next poll.
Other GPIO's and UART ports are read in similar fashion. Note that GPIO_7-10s are not yet enabled in this example and GPIO_7 has a pending request to enable the port.

According to another aspect, UART communications may also be accomplished by table status notification in a manner similar to that described above for the GPIO information, except there is no "ACK". In this embodiment, only notification of UART contents of pending as communication events tracked by a two digit (0-99) "Sequence#". This is the serial order which the Text messages are generated or queued for output. Character length of the message may follow, and then the text message contents may be shown.

The following additional elements or tasks are present in FIG. 3:

302: Poll;
304: 0—Poll Not set, 1—Poll set, no change, 2—Poll change request, 3—Poll fault set;
306: Default to 1 sec if 304 is 0;
308; Send Poll <Time=2x>;
310: Initialize poll time;
312: Send poll <Time>;
314: Initialize poll time;
316: Initialization I/O, 314;
318: Initial I/O 0, 1, 1,0 . . . ;
320: I/O Table;
322: Send <I/O control>;
324: OK;
326: ACK;
328: Input Reads;
330: Read 0, 1, 1, 0;
332: Input Read Command Generation;
334: Send <Read, Input #>;
336: OK, Send <Read, Input #>;
338: ACK;
340: Decision matrix;
342: Output Sets;
344: Set 0,1 1,0;
346: Output Set Command Generator;
348: Send <Output, 0, 1; output#>;
350: OK;
352: ACK, 0, 1', 1, 1;
354: SMS Receive status used?;
356: SMS Receive Status;
358: Transmission;
360: Get SMS Receive status;
362: Send <SMS ??;
364: +CMSS 0, 1 . . . OK;
366: ACK;
368: Decision matrix;
370: Generate SMS message;
372: SMS <1919 . . . msg>;
374: Send SMS;
376: Send SMS <1919 . . . msg>;
378: OK;
380: ACK;
382: Decision matrix;
384: Transmission;
386: Poll Time exceeded?;
388: Set "Poll Fault" register;
390: Reset "Poll Fault"; and
392: Cycle end.

Figure 4:
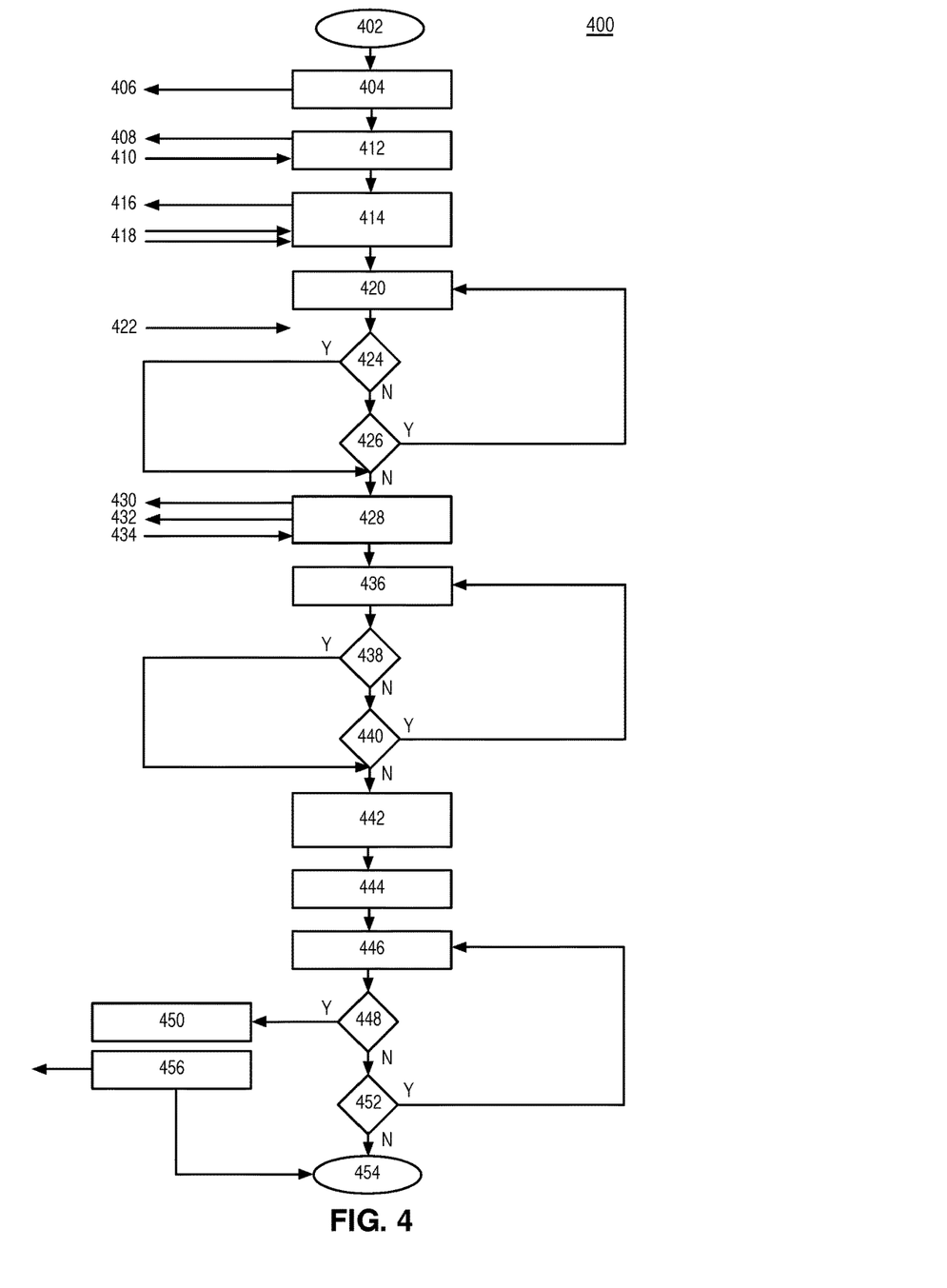
FIG. 4 is a process flow diagram of an example customer application suitable for use with a system disclosed herein according to one embodiment of the subject matter described herein.

FIG. 4 is a process flow diagram for an example customer application suitable for use with a SIMbae according to one embodiment of the subject matter described herein. In this example, the Customer Application is configured to measure the battery voltage, power the GPS, retrieve location information, depower the GPS, and then send an SMS message to predetermined phone number. Message content includes: battery voltage, GPS location, and time of day. The program then listens for an SMS response to determine if a change in report timing is required. If no response is received then the same process is repeated for the next wake event. Program execution is controlled by the module power-up and wake-up criteria (wake from sleep by DTR, or Alarm setting). The customer app uses the GPIO and UART control table method as described herein. In one embodiment, the wake and GPS control may be provided by module functions calls.

The following additional elements or tasks are present in the diagram 400 in FIG. 4:

402: Enter;
404: Turn on GPS;
406: Msg: GPS Power on:
408: Msg: Read ADC;
410: Msg: ADC reading;
412: Get battery voltage from ADC;
414: Set NMEA message type to time, latitude, and longitude;
416: Msg: GSP Msg type set;
418: Msg: GPS Location msg (1/sec);
420: Time delay=10 seconds;
422: Msg: GPS location msg (1/sec);
424: If acquired?;
426: If delay count <5;
428: Turn on GPS, Get Registration status;
430: Msg: GSPS power off;
432: Msg: AT+CREG?;
434: Msg: +CREG=1 or 5;
436: Time delay=10 seconds;
438: If Network registered?;
440: If delay count <3;
442: Compose SMS message—time, latitude, longitude, battery voltage, reporting event status;
444: Send SMS to "phone#";
446: Time delay=10 seconds;
448: SMS reply received?;
450: Log reporting event status;
452: if delay count <5; and
454: Sleep.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented on a first device that is a subscriber identification module (SIM) having a processor and a memory including executable instructions, the method comprising:
executing a customer application on the SIM using the executable instructions, wherein the SIM is installed in a second device and the customer application is configured to generate one or more files for controlling a remote device, and
executing a control application on the SIM using the executable instructions, wherein the control application is configured for providing an encrypted data communications link to an input/output (I/O) component on the second device, wherein the I/O component is configured for transmitting the one or more files to the remote device; wherein the control application is further configured for simulating a serial communications interface for providing the encrypted data communications link to the I/O component; and
wherein the control application is further configured for providing a table formatted interface to the customer application and the table formatted interface is configured to provide the customer application control of the I/O component.

2. The method of claim 1, wherein the I/O component is one of a Universal Asynchronous Receiver/Transmitter (UART), a Universal Serial Bus (USB), and a General Purpose Input/Output (GPIO) component.

3. The method of claim 1, wherein the I/O component is configured for communicating with the remote device over a network.

4. The method of claim 1, wherein providing the encrypted data communications link includes providing multiple data communications links with the second device.

5. A system comprising:
a first device that is a subscriber identification module (SIM), wherein the first device comprises:
a memory including executable instructions; and
a processor, wherein the first device is operable for:
executing a customer application on the SIM using the executable instructions, wherein the SIM is installed in a second device and the customer application is configured to generate one or more files for controlling a remote device; and
executing a control application on the SIM using the executable instructions, wherein the control application is configured for providing an encrypted data communications link to an input/output (I/O) component on the second device, wherein the I/O component is configured for transmitting the one or more files to the remote device; wherein the control application is further configured for simulating a serial communications interface for providing the encrypted data communications link to the I/O component; and
wherein the control application is further configured for providing a table formatted interface to the customer application and the table formatted interface is configured to provide the customer application control of the I/O component.

6. The system of claim 5, wherein the encrypted data communications link includes multiple data communications links.

7. The system of claim 5, wherein the SIM includes an encryption key.

8. The system of claim 5, wherein the control application is further configured for receiving data from the remote device.

9. The system of claim 5, wherein the remote device is a display screen.

10. The system of claim 5, wherein the I/O component is configured for transmitting to the remote device over a wireless connection.

11. The system of claim 10, wherein the wireless connection is a cellular connection.

12. The system of claim 10, wherein the control application is further configured for receiving a poll from the second device.

13. The system of claim 12, wherein the control application is further configured for transmitting new data in response to receiving the poll.

14. A non-transitory computer readable storage medium storing executable instructions to be implemented on subscriber identification module (SIM) having a processor and a memory, the executable instructions when executed by the processor cause the SIM to perform a method comprising:
executing a customer application on the SIM using the executable instructions, wherein the SIM is installed in a second device and the customer application is configured to generate one or more files for controlling a remote device, and
executing a control application on the SIM using the executable instructions, wherein the control application is configured for providing an encrypted data communications link to an input/output (I/O) component on the second device, wherein the I/O component is configured for transmitting the one or more files to the remote device; wherein the control application is further configured for simulating a serial communications interface for providing the encrypted data communications link to the I/O component; and
wherein the control application is further configured for providing a table formatted interface to the customer application and the table formatted interface is configured to provide the customer application control of the I/O component.

15. The system of claim 5, wherein the customer application is a Java Card Run Environment (JCRE) program.

16. The system of claim 5, wherein the table formatted interface is further configured to provide the customer application a message table.

17. The system of claim 16, wherein the customer application is configured to retrieve battery voltage, GPS location, and time of day data via the message table.

* * * * *